United States Patent
Coffey et al.

(10) Patent No.: US 6,925,887 B1
(45) Date of Patent: Aug. 9, 2005

(54) BLAST PRESSURE GAUGE

(75) Inventors: Charles S. Coffey, Clarksville, MD (US); John R. Renzi, Ellicott City, MD (US); John P. Martin, Collage Park, MD (US); William M. Hinckley, Bowie, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/421,432

(22) Filed: Apr. 17, 2003

(51) Int. Cl.[7] .................................................. G01F 23/00
(52) U.S. Cl. ................ 73/774; 73/861.47; 250/363.01; 310/338
(58) Field of Search ............... 73/170.15, 861.47, 73/170.08, 170.09, 774; 250/363.01

(56) References Cited

U.S. PATENT DOCUMENTS

| | | | |
|---|---|---|---|
| 2,601,778 A | * | 7/1952 | Gordon .................... 73/35.14 |
| 2,618,962 A | * | 11/1952 | Plumley et al. ............ 73/35.16 |
| 2,875,352 A | * | 2/1959 | Orlacchio ................... 310/338 |
| 4,212,191 A | * | 7/1980 | Ethridge ................... 73/861.47 |
| 4,682,034 A | * | 7/1987 | Saint et al. ............ 250/363.01 |
| 5,241,518 A | * | 8/1993 | McNelis et al. ............ 367/127 |
| 5,315,354 A | | 5/1994 | Mordenga ..................... 356/32 |
| 5,435,178 A | | 7/1995 | Edwards .................. 73/170.15 |
| 5,442,948 A | * | 8/1995 | Cowing ..................... 73/19.05 |
| 5,638,298 A | * | 6/1997 | Edwards ..................... 73/167 |
| 6,450,006 B1 | * | 9/2002 | Dougherty .................. 73/19.1 |

\* cited by examiner

*Primary Examiner*—Michael Cygan
*Assistant Examiner*—Andre Allen
(74) *Attorney, Agent, or Firm*—Fredric Zimmerman

(57) ABSTRACT

An apparatus for measuring pressure includes a cylindrical tube having an open end and a closed end; a piston disposed in the cylindrical tube at the open end; an accelerometer attached to a side of the piston that faces the closed end of the tube, the accelerometer for measuring the acceleration of the piston after a blast event; and a pressure sensor located inside the tube for measuring pressure in the tube between the piston and the closed end of the tube. The apparatus also includes a data processor and computer connected by wires to the accelerometer and pressure sensor for receiving signals generated by the accelerometer and pressure sensor.

18 Claims, 2 Drawing Sheets

BLAST PRESSURE GAUGE

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to an apparatus for measuring pressure generated from the detonation of explosives and in particular to an apparatus that can measure such pressure for an extended time after the initial peak pressure.

In the development of new non-ideal explosives, a measurement of the late time conditions is required to understand the explosive performance. Therefore, a pressure gauge that will survive the interior pressure of the blast (i.e., the area of high temperatures, turbulence and debris) and measure the performance of a complex blast wave is required. Many known gauges for measuring pressure generated by explosives become saturated by the initial pressure pulse and are not able to continue measuring the pressure after the initial pressure pulse. The present invention is not saturated by the initial pressure pulse, thereby allowing measurement and evaluation of the late time phenomenon of the explosive. In addition, the present invention can survive the hostile environment of the blast.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

Figure 1:
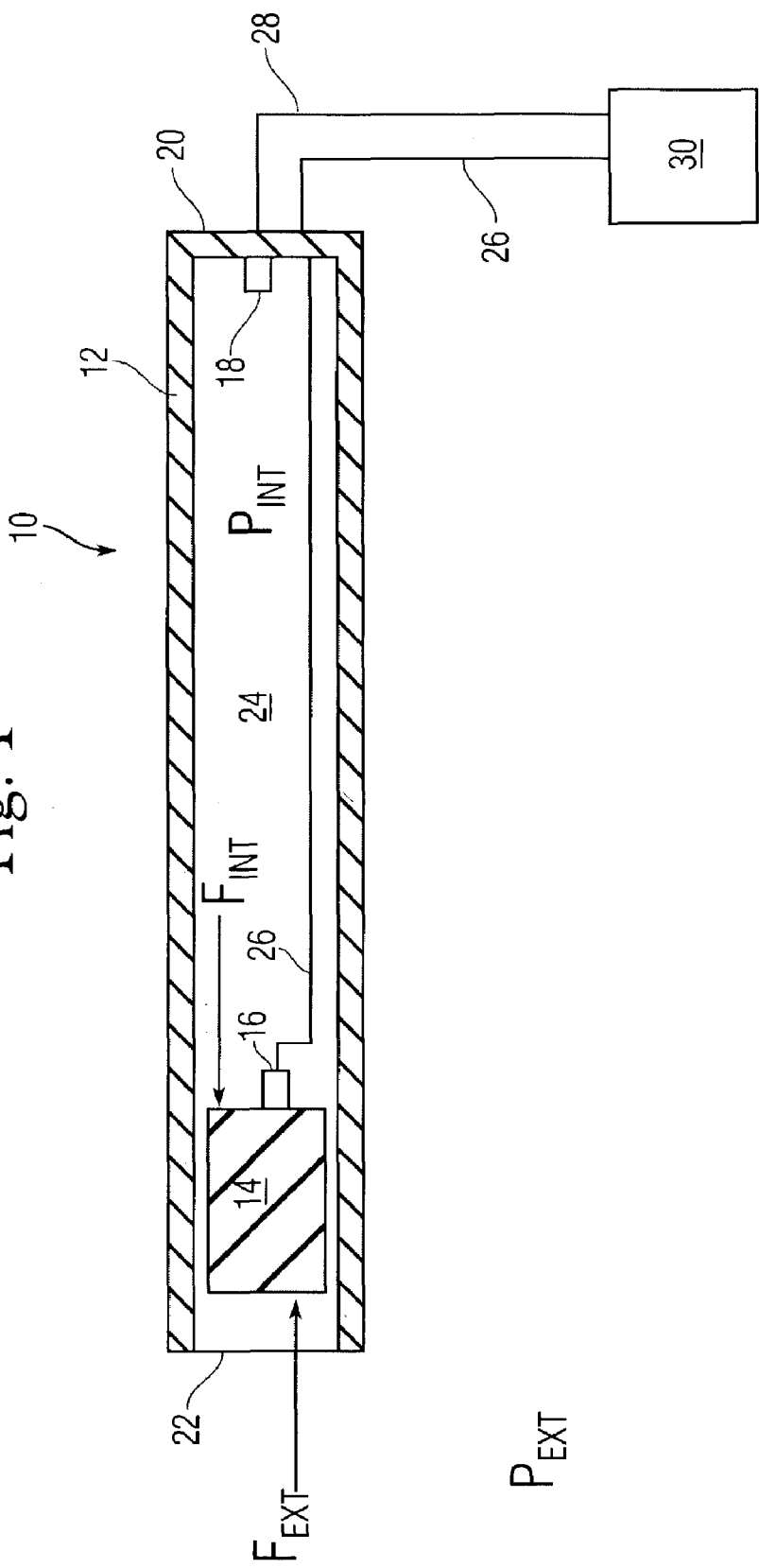
FIG. 1 is a schematic diagram of the invention illustrating the principle of operation.

FIG. 1 is a schematic diagram of the invention illustrating the principle of operation. FIG. 1 shows an apparatus 10 for measuring pressure. The apparatus 10 includes a cylindrical tube 12 having an open end 22 and a closed end 20, a piston 14 disposed in the tube 12 at the open end 22 and an accelerometer 16 attached to the side of the piston 14 that faces the closed end 20 of the tube 12. The accelerometer 16 measures the acceleration of the piston 14 after a blast event. A pressure sensor 18 is located inside the tube 12 for measuring pressure in the tube 12 between the piston 14 and the closed end of the tube 20, that is, the pressure in volume 24. The open end 22 of tube 12 is directed at the point of detonation of the blast event.

A data processor/computer 30 receives signals from accelerometer 16 and pressure sensor 18 via electric wires 26, 28. The data processor/computer 30 converts signals produced by accelerometer 16 and pressure sensor 18 into appropriate signal voltages and then computes the exterior pressure, as discussed in detail below.

Exterior pressure $P_{ext}$ is the pressure outside tube 12 and is the quantity desired to be known. $F_{ext}$ is the force exerted by the exterior pressure $P_{ext}$ on piston 14; Piston 14 has a mass M, a cross-sectional area A and an acceleration a. Interior volume 24 has a pressure $P_{int}$ that produces a force $F_{int}$ on piston 14. Balancing the forces on piston 14 results in:

$F_{ext} - F_{int} = Ma$, but $F_{ext} = P_{ext} A$, and $F_{int} = P_{int} A$, so that $P_{ext} = (Ma/A) + P_{int}$.

A and M are known, a and $P_{int}$ are measured, therefore, one can solve for $P_{ext}$.

Tube 12 and piston 14 are made of, for example, steel or a steel alloy. The length of tube 12 may vary, depending on how close the apparatus 10 is to the blast. The closer to the blast, the longer the tube 12 needs to be to allow for travel of the piston 14 in the tube 12. If the apparatus 10 is located within the immediate blast area, for example, about six inches from the detonation point, then the tube 12 should be from about two to three feet long. If the apparatus 10 is outside the immediate blast area, then the tube 12 may need to be only about six inches long. It is important that the open end 22 of tube 12 is directed toward the detonation point. Multiple apparatus 10 may be used around the detonation area, at different ranges from the detonation point.

The wall thickness of tube 12 is, for example, about 0.5 inches. The tube 12 must be able to withstand the effects of the explosion. An exemplary inside diameter of tube 12 is about two inches. An exemplary mass M for piston 14 is about one kilogram. It is important that the tube 12 and piston 14 are precisely machined. The clearance between the tube 12 and piston 14 should be on the order of about one mil. The clearance is important so that passage of any gas around the piston 14 is minimized or completely eliminated. Pressure sensor 18 is preferably mounted on the internal surface of the closed end 20 of tube 12. Pressure sensor 18 may be a standard commercially available sensor such as the brand "Endevco."

Figure 2:
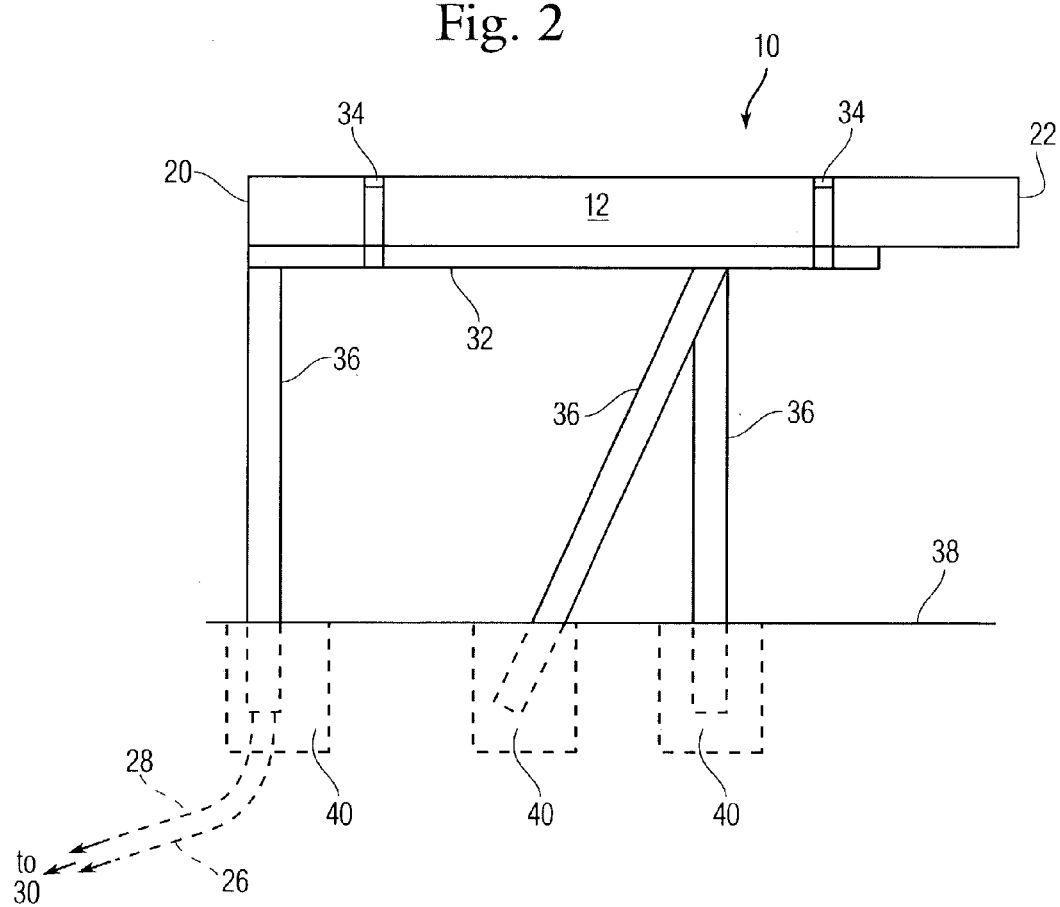
FIG. 2 is a schematic diagram of a mount for the blast gauge.

FIG. 2 is a schematic diagram of an example of a mount for the blast gauge. Tube 12 is placed in a generally concave resting plate 32. The concavity of resting plate 32 mates with the cylindrical shape of tube 12. Tube 12 is fixed to resting plate 32 by a plurality of clamps 34. Open end 22 of tube 12 is directed towards the blast center. Resting plate 32 is supported by stanchions 36. Stanchions 36 penetrate below ground level 38 and are secured in place by cement 40. The stanchion 36 at the closed end 20 of tube 12 receives wires 26, 28 from accelerometer 16 and pressure sensor 18, respectively. Wires 26, 28 exit stanchion 36 underground and continue underground to a safe distance from the blast where they are connected to data processor/computer 30.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for measuring pressure, comprising:
   a cylindrical tube having an open end and a closed end;
   a piston disposed in the cylindrical tube at the open end;
   an accelerometer attached to a side of the piston that faces the closed end of the tube, the accelerometer for measuring the acceleration of the piston after a blast event; and a pressure sensor located inside the cylindrical tube for measuring pressure in the cylindrical tube between the piston and the closed end of the cylindrical tube.

2. The apparatus of claim 1 further comprising a data processor and computer connected by wires to the accelerometer and the pressure sensor for receiving signals generated by the accelerometer and the pressure sensor.

3. The apparatus of claim 1 wherein the cylindrical tube and the piston are made of one of steel and a steel alloy.

4. The apparatus of claim 1 wherein a length of the cylindrical tube is in a range from about six inches to about three feet.

5. The apparatus of claim 1 wherein a wall thickness of the cylindrical tube is about one half inch.

6. The apparatus of claim 1 wherein an inside diameter of the cylindrical tube is about two inches.

7. The apparatus of claim 1 wherein a mass of the piston is about one kilogram.

8. The apparatus of claim 1 wherein a radial clearance between the cylindrical tube and the piston is about one mil.

9. The apparatus of claim 1 wherein the pressure sensor is located on an inside surface of the closed end of the cylindrical tube.

10. The apparatus of cam 2 further comprising a mount for holding the cylindrical tube.

11. The apparatus of claim 10 wherein the mount comprises a resting plate, the cylindrical tube being fixed to the resting plate with clamps, and a plurality of stanchions connected to the resting plate at one end and inserted below ground level at another end.

12. The apparatus of claim 11 wherein the stanchions are secured below ground level with cement.

13. The apparatus of claim 11 wherein one stanchion is disposed at the closed end of the cylindrical tube for receiving therein the wires connecting the accelerometer and the pressure sensor to a data processor and a computer.

14. The apparatus of claim 13 wherein the wires exit the one stanchion below ground level and continue underground for a safe distance to the data processor and the computer.

15. The apparatus according to claim 1, wherein said pressure sensor is attached to said closed end.

16. The apparatus according to claim 1, wherein said closed end comprises a non-moveable end of said cylindrical tube.

17. The apparatus according to claim 1, wherein said accelerometer is moveable in a direction of said pressure sensor.

18. The apparatus according to claim 1, wherein said side comprises an external surface of said piston.

* * * * *